(12) United States Patent
James

(10) Patent No.: US 9,430,565 B2
(45) Date of Patent: Aug. 30, 2016

(54) PROVIDING RELEVANT CONTENT

(71) Applicant: ZEFR, Inc., Venice, CA (US)

(72) Inventor: Zacharias Lee James, Venice, CA (US)

(73) Assignee: ZEFR, INC., Venice, CA (US)

( * ) Notice: Subject to any disclaimer, the term of this patent is extended or adjusted under 35 U.S.C. 154(b) by 270 days.

(21) Appl. No.: 14/161,158

(22) Filed: Jan. 22, 2014

(65) Prior Publication Data

US 2015/0205793 A1 Jul. 23, 2015

(51) Int. Cl.
*G06F 17/30* (2006.01)

(52) U.S. Cl.
CPC .................. *G06F 17/30858* (2013.01)

(58) Field of Classification Search
None
See application file for complete search history.

(56) References Cited

U.S. PATENT DOCUMENTS

| | | | | |
|---|---|---|---|---|
| 8,856,113 B1* | 10/2014 | Sinton | ............... | G06F 17/30837 |
| | | | | 707/728 |
| 2006/0282336 A1* | 12/2006 | Huang | ............... | G06F 17/30864 |
| | | | | 705/26.61 |
| 2007/0282819 A1* | 12/2007 | Lynn | ............... | G06F 17/30876 |
| 2008/0104521 A1* | 5/2008 | Dubinko | ............ | G06F 17/30867 |
| | | | | 715/744 |
| 2009/0182734 A1* | 7/2009 | Wen | ................. | G06F 17/30864 |
| 2009/0198662 A1* | 8/2009 | Prabhakar | ......... | G06F 17/30864 |
| 2009/0240680 A1* | 9/2009 | Tankovich | .......... | G06F 17/3053 |
| 2009/0248672 A1* | 10/2009 | McIntire | ............. | G06F 17/3002 |
| 2011/0184956 A1* | 7/2011 | Dantsker | ........... | G06F 17/30864 |
| | | | | 707/741 |
| 2012/0054278 A1* | 3/2012 | Taleb | ..................... | G06Q 50/01 |
| | | | | 709/204 |
| 2012/0095987 A1* | 4/2012 | Cheng | ............... | G06F 17/30442 |
| | | | | 707/713 |
| 2014/0222775 A1* | 8/2014 | Zohar | ............... | G06F 17/30864 |
| | | | | 707/709 |
| 2015/0112976 A1* | 4/2015 | Beebe | ............... | G06F 17/30864 |
| | | | | 707/723 |
| 2015/0193444 A1* | 7/2015 | Gardiner | ................ | G06Q 50/01 |
| | | | | 707/726 |

FOREIGN PATENT DOCUMENTS

| | | | | | |
|---|---|---|---|---|---|
| SG | WO 2012067586 A1 * | 5/2012 | ......... | G06F 17/3082 |
| WO | WO 2007143314 A2 * | 12/2007 | ....... | G06F 17/30864 |

* cited by examiner

*Primary Examiner* — Aleksandr Kerzhner
*Assistant Examiner* — Eddy Cheung
(74) *Attorney, Agent, or Firm* — Kunzler Law Group; Scott D. Thorpe

(57) ABSTRACT

For providing relevant content, a search module indexes each content identifier for content received in a search result to content data. The content comprises related content identifiers. The search module further iteratively retrieves content for the indexed content identifiers and indexes the related content identifiers for the retrieved content until all related content identifiers for all the indexed content identifiers are indexed. A relevance module identifies relevant content and provides the relevant content.

15 Claims, 10 Drawing Sheets

255

| Content Identifier 260 |
| Content Title 210 |
| Content Description 215 |
| Content Information 220 |
| Content Comments 223 |
| Content Data 265 |
| Content Length 266 |
| Content Channel 267 |
| Search Query 268 |
| Related Content IDs 270 |
| Relevance Score 273 |
| Relevance Value 275 |
| Relation Data 281 |
| Engagement Score 283 |
| Content Evaluation 292 |

| Content ID | Relevance Score | Title | Content Claimant | Content Channel | Date |
|---|---|---|---|---|---|
| 705 | 710 | 715 | 720 | 725 | 730 |
| Content ID | Relevance Score | Title | Content Claimant | Content Channel | Date |
| 705 | 710 | 715 | 720 | 725 | 730 |
| Content ID | Relevance Score | Title | Content Claimant | Content Channel | Date |
| 705 | 710 | 715 | 720 | 725 | 730 |
| Content ID | Relevance Score | Title | Content Claimant | Content Channel | Date |
| 705 | 710 | 715 | 720 | 725 | 730 |

PROVIDING RELEVANT CONTENT

BACKGROUND

1. Field

The subject matter disclosed herein relates to content and more particularly relates to providing relevant content.

2. Description of the Related Art

Content hosts such as YOUTUBE® store massive quantities of content. As a result, search results often do not include some content that is relevant to other content.

BRIEF SUMMARY

A method for providing relevant content is disclosed. A search module indexes each content identifier for content received in a search result to content data. Each content comprises related content identifiers. The search module further iteratively retrieves content for the indexed content identifiers and indexes the related content identifiers for the retrieved content until all related content identifiers for all the indexed content identifiers are indexed. A relevance module identifies relevant content and provides the relevant content. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4B is a schematic block diagram illustrating one embodiment of a content entry;

DETAILED DESCRIPTION

Figure 1:
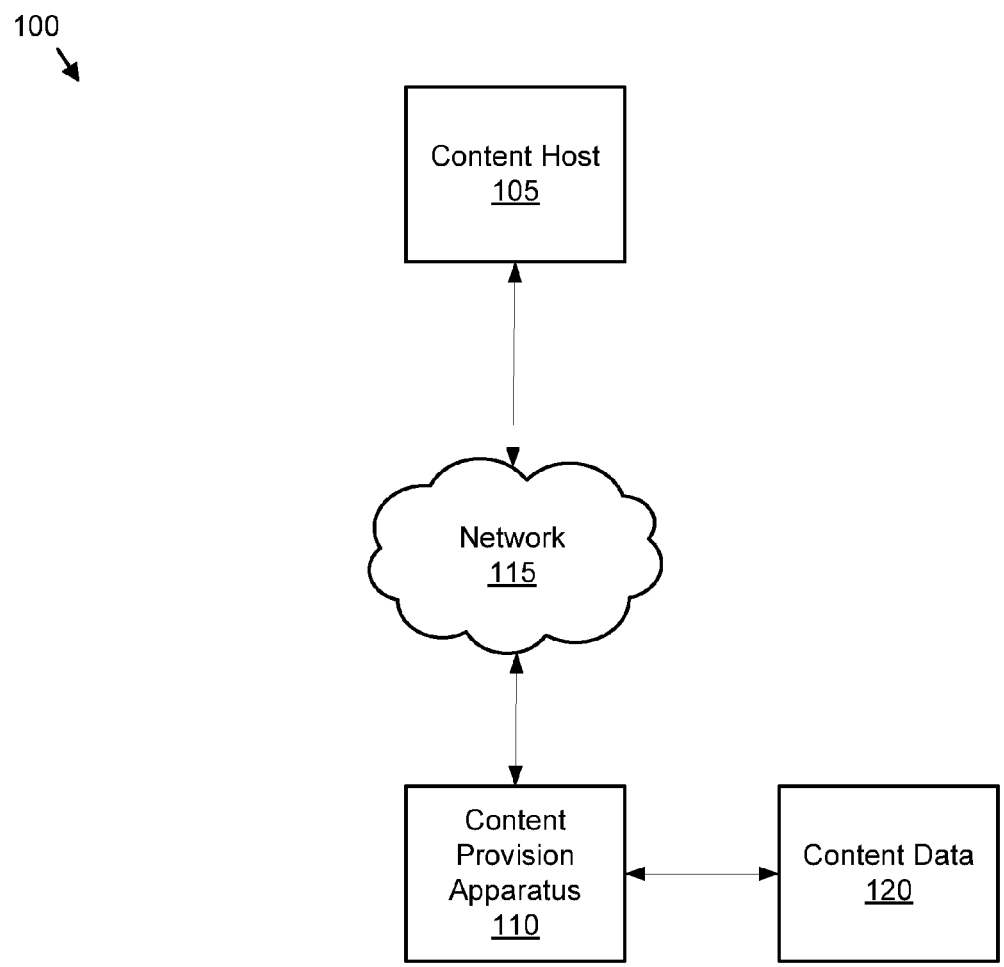
FIG. 1 is a schematic block diagram illustrating one embodiment of a content system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave.

Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a schematic block diagram illustrating one embodiment of a content system 100. The content system 100 includes a content host 105, a content provision apparatus 110, content data 120, and a network 115.

The content host 105 may receive submissions of content. The content host 105 may then store the content and make the content available to users through the network 115. In one embodiment, the content is available to general public users. In alternate embodiments, access to the content is restricted to member users.

The submitters, owners, and managers of content on the content host 105 may be remunerated according to the number of times content is provided to users. The provision of content to users is hereafter referred to as views.

Content views may be increased when the content is associated with other relevant content. Unfortunately, because of the enormous quantities of content that are submitted to a content host 105, a human searcher cannot provide a comprehensive organization of relevant content. It without such a comprehensive organization of relevant content, potential content associations, and the resulting views and revenue may be lost.

The content host 105 may be organized as a plurality of servers. The content provision apparatus 110 may also be organized as one or more servers. The content data 120 may be organized as a database stored on a storage device such as a hard disk array for the content provision apparatus 110.

The content provision apparatus 110 may communicate with the content host 105 through the network 115. The content provision apparatus 110 may retrieve content from the content host 105 and index the content as the content data 120.

The embodiments described herein provide relevant content from the content host 105. The content provision apparatus 110 may iteratively retrieve content from the content host 105 to create an exhaustive organization of potentially relevant content that is indexed in the content data 120. In addition, the content provision apparatus 110 may identify and provide the relevant content as will be described hereafter. As a result, the relevant content may be associated with managed content within the content host 105, significantly increasing the views and revenue for the managed content.

Figure 2A:
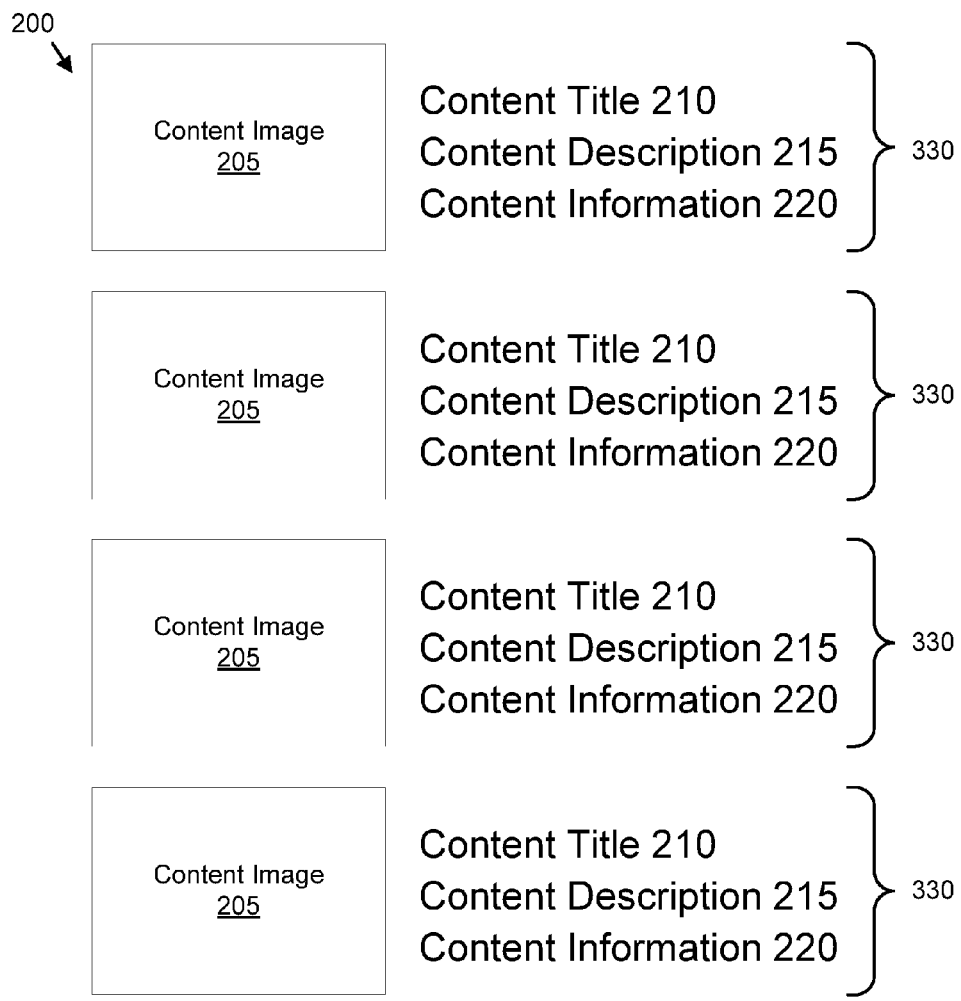
FIG. 2A is a drawing illustrating on embodiment of a search result.

FIG. 2A is a drawing illustrating one embodiment of search results 200. The search results 200 may be retrieved from the content host 105 in response to a search query. The search query may comprise keywords, example content, a hash of content 330, content organizer parameters, and the like. The keywords may be directed to a description of the content 330, characteristics of the content 330, or the like. The example content may be used as a comparison for identifying similar content 330 such as with text clustering. The hash of content 330 may be used to identify content 330 that contains similar segments. The content organizer parameters may identify channels, owners, submitters, and the like for the content 330.

In the depicted embodiment, each of the instances of content 330 includes a content image 205, a content title 210, a content description 215, and content information 220. The content image 205 may be a still image from video content 330, a video segment of video content 330, a composite of still images, a composite of video segments, and the like.

The content title 210 may briefly describe and/or label the content 330. The content description 215 may provide a more detailed description of the content 330. The content information 220 may provide additional information about the content 330 including but not limited to an identity of the submitter, a submission time indicator, a number of views for the content 330, links for the content 330, and the like.

In one embodiment, content identifiers may be embedded in one or more of the content image 205, the content title 210, the content description 215, the content information 220, the content length 266, the content channel 267, and the search query 268. For example, a content identifier may be an embedded link. Alternatively, a content identifier may be displayed as part of one of the content image 205, content title 210, content description 215, and content information 220.

Figure 2B:
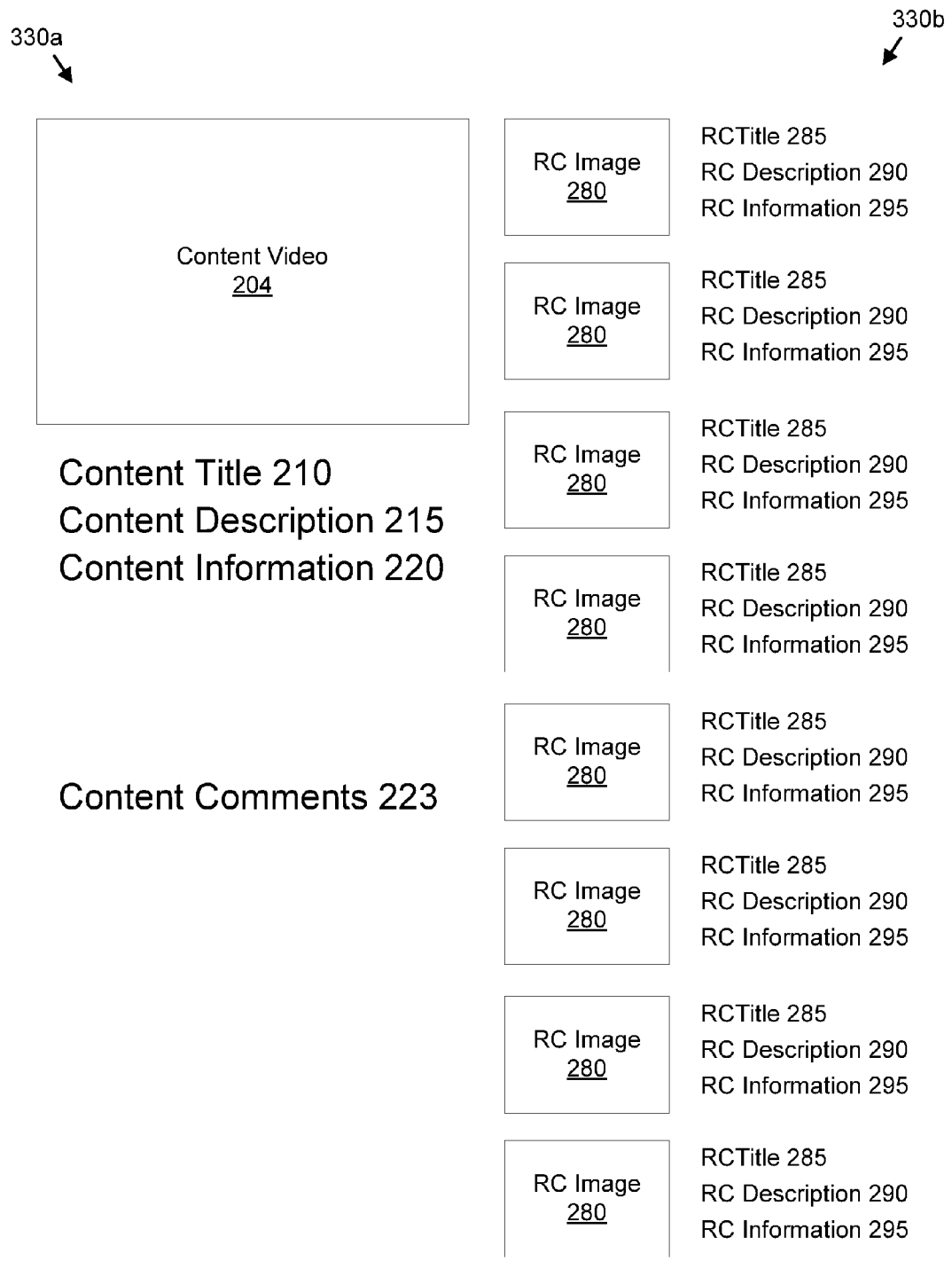
FIG. 2B is a drawing illustrating one embodiment of related content.

FIG. 2B is a drawing illustrating search result content 330a and related content 330b. In the depicted embodiment, the search result content 330a may be displayed in response to a selection of the content 330a of FIG. 2A. As a result of the selection, a content video 204 is displayed, along with the content title 210, the content description 215, and the content information 220 for the search result content 330a. In the depicted embodiment, content comments 223 are also shown for the search result content 330a. The content comments 223 may include but are not limited to "likes" of the content 330a, comments regarding the content 330a from other users, ratings, and/or compilations of ratings. One of skill in the art will recognize that the embodiments may be practiced with other organizations of the search result content 330a and related content 330b.

The related content 330b may include a plurality of instances. Each instance of related content 330b may include a related content image 280, a related content title 285, a related content description 290, and related content information 295. The related content title 285, related content description 290, and related content information 295 may be equivalent to the content title 210, the content description 215, and the content information 220 respectively.

The related content 330b may also include related content identifiers. The related content identifiers may be embedded in one or more of the related content title 285, the related content description 290, and/or the related content information 295. In one embodiment, the related content identifiers are embedded as embedded links comprising universal resource locators (URL).

In the past, time constraints have typically limited a human searcher when searching for relevant content 330. The embodiments described herein support the retrieval of a much more comprehensive organization of relevant content 330 as will be described hereafter.

Figure 3:
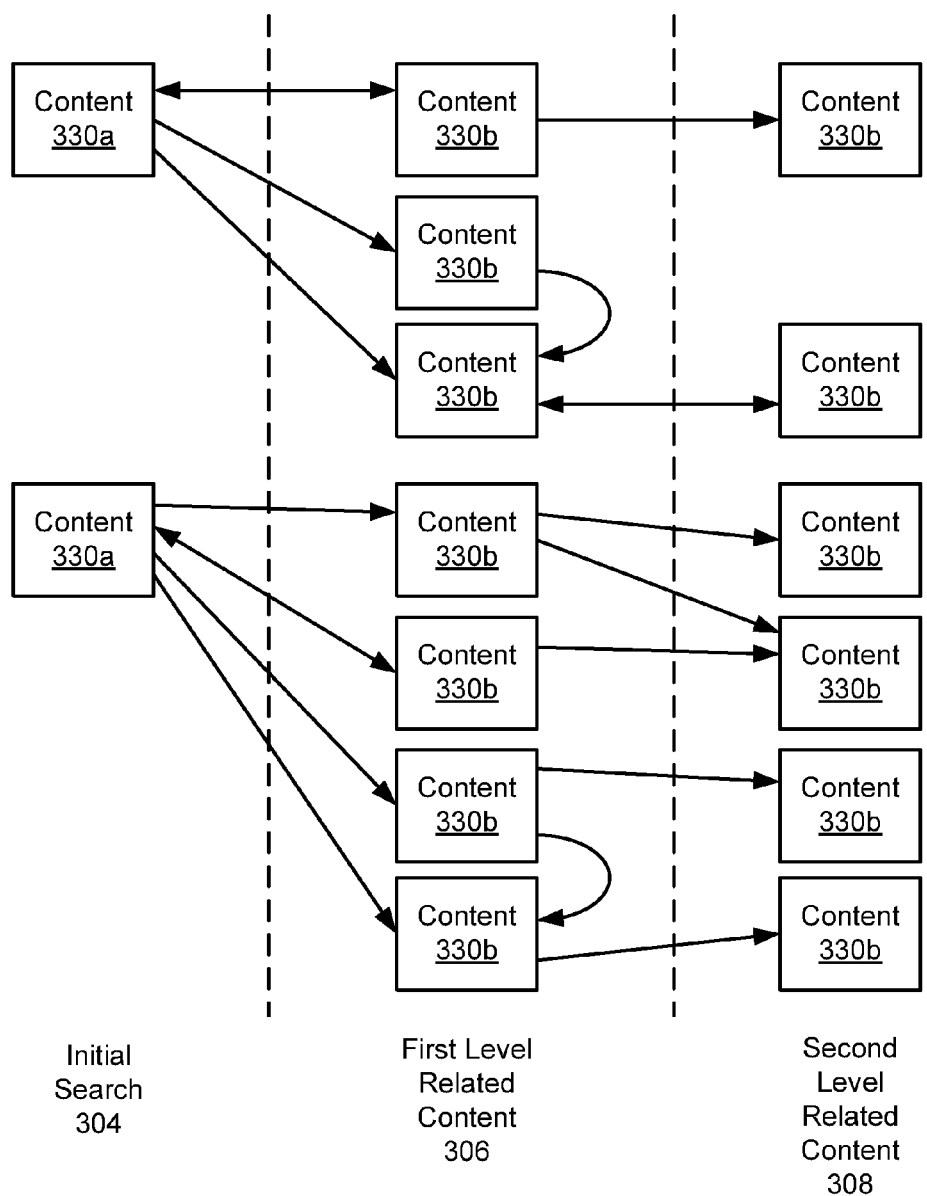
FIG. 3 is a schematic block drawing illustrating one embodiment of iterative content retrieval.

FIG. 3 is a schematic block drawing illustrating one embodiment of iterative content retrieval 302. Search result content 330a is depicted for an initial search 304. The search result content 330a may be retrieved in response to the search query. Each of the search result content 330a may be associated with related content 330b. Arrows indicate associations between the content 330. For example, content 330 at an end of an arrow may be related content 330b for the content 330 at the start of the arrow.

In the iterative content retrieval 302, the related content 330b for the search result content 330a may also be retrieved as first level related content 306. Subsequently, related content 330b for the first level related content 306 may be retrieved as second level related content 308. Although not shown for simplicity, the related content 330b may be iteratively retrieved and indexed as content data 120 until all the related content 330b has been retrieved and indexed. The iterative content retrieval 302 thus generates a comprehensive organization of the related comment 330b.

Figure 4A:
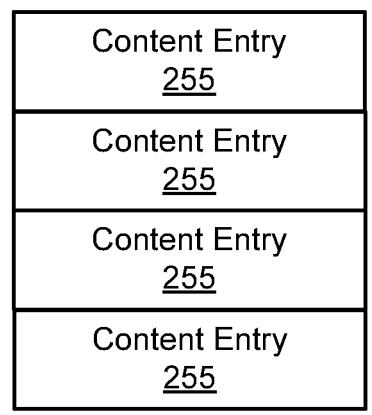
FIG. 4A is a schematic block diagram illustrating one embodiment of content data.

FIG. 4A is a schematic block diagram illustrating one embodiment of content data 120. The content data 120 may be organized as a database, linked data structures, a flat file, or combinations thereof. The content data 120 may include a plurality of content entries 255. In one embodiment, each instance of content 330 is indexed with a content entry 255. For example, each instance of content 330 with a unique identity at the content host 105 may be indexed with a content entry 255. Alternatively, each substantially similar instance of content 330 that is stored by the content host 105 may be indexed with a single content entry 255.

FIG. 4B is a schematic block diagram illustrating one embodiment of the content entry 255. The content entry 255 includes a content identifier 260, the content title 210, the content description 215, the content information 220, the content comments 223, content data 265, a content length 266, a content channel 267, the search query 268, related content identifiers 270, a relevance score 273, a relevance value 275, relation data 281, an engagement score 283, and a content evaluation 292.

The content identifier 260 may uniquely identify the content 330 for the content host 105. The content identifier 260 may be a URL, a unique alphanumeric string, or combinations thereof.

The content data 265 may include additional information about the content 330. The content data 265 may include but is not limited to metadata for the content 330, content claimants, content owners, and the like. The content length 266 may describe the length of the content 330. The content length 266 may be measured in seconds, frames, pixels, or combinations thereof. The content channel 267 may record an identity of each channel of the content host 105 with which the content 330 is associated.

The search query 268 may be an original query that led to the retrieval of the content 330. In an alternative embodiment, the search query 268 may include all queries that lead to the retrieval of the content 330. The related content identifiers 270 are the content identifiers 260 for the related content 330b of the content 330. Alternatively, the search query 268 may record initial content 330 from which other related content 330b is identified.

The relevance score 273 may be calculated as a function of content elements. In one embodiment, the relevance score 273 is calculated as a function of the relevance values 275 for the content elements. The relevance value 275 may be calculated to describe the relevance of content elements such as the content title 210, the content description 215, the content information 220, and the like.

The relation data 281 may comprise data describing the relationship of the content 330 to the related content 330b. In one embodiment, the relation data 281 includes an association count. The association count may sum each instance of the content 330 being related content 330b in the content data 120. In one embodiment, the association count may sum each instance of the content 330 being related content 330b in the content data 120 for a specified search query 268 and/or specified initial content 330.

The engagement score 283 may be calculated as a function of responses to content 330 as will be described hereafter. The responses may be the content comments 223. The content evaluation 292 may describe a relevance of a selected instance of content 330 as will be described hereafter.

Figure 5:
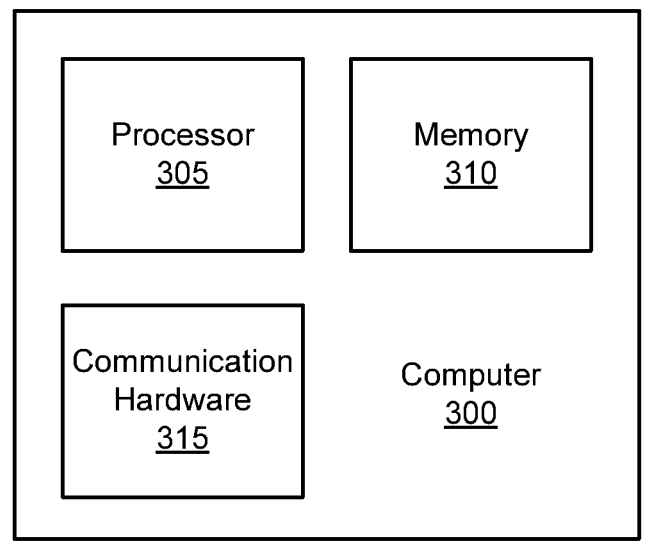
FIG. 5 is a schematic block diagram illustrating one embodiment of a computer.

FIG. 5 is a schematic block diagram illustrating one embodiment of a computer 300. The computer 300 may be a server, the server blade, a mainframe computer, or the like. The computer 300 includes a processor 305, a memory 310, and communication hardware 315. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices and/or the network 115.

Figure 6:
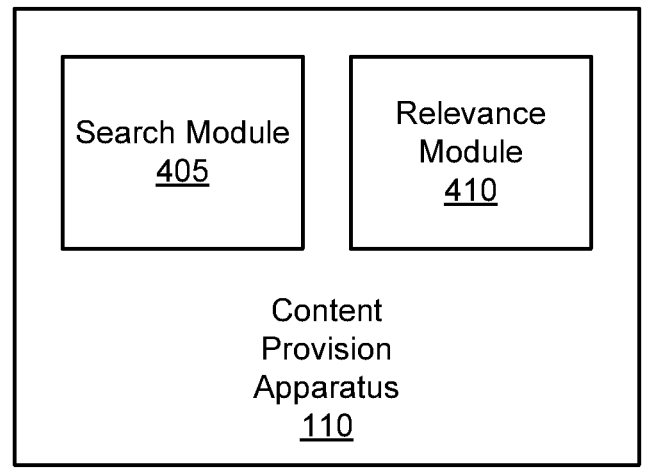
FIG. 6 is a schematic block diagram illustrating one embodiment of a content provision apparatus.

FIG. 6 is a schematic block diagram illustrating one embodiment of the content provision apparatus 110. The content provision apparatus 110 may be embodied in the computer 300. The content provision apparatus 110 includes a search module 405 and a relevance module 410. The search module 405 and the relevance module 410 may be embodied in a computer readable storage medium, such as the memory 310, storing program code.

The search module 405 may index each content identifier 260 for the content 330 received in the search result 200 as a content entry 255 in the content data 120. The search module 405 may further iteratively retrieve content 330 for the indexed content identifiers 260 and index the related content identifiers 270 for the retrieved content 330 until all the related content identifiers 270 for all the index content identifiers 260 are indexed.

The relevance module 410 may identify the relevant content 330 from the index content 330. In addition, the relevance module 410 may provide the relevant content 330 as will be described hereafter.

Figure 7:
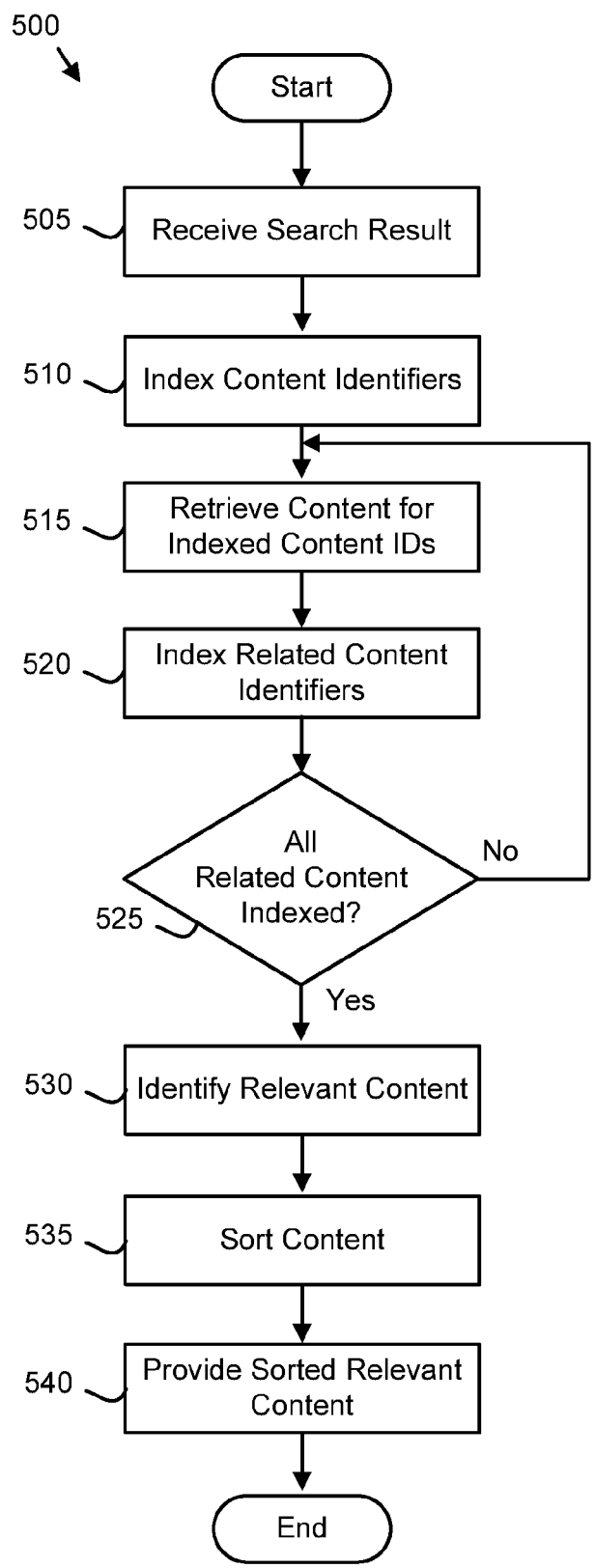
FIG. 7 is a schematic flow chart diagram illustrating one embodiment of a content provision method.

FIG. 7 is a schematic flow chart diagram illustrating one embodiment of a content provision method 500. The method 500 creates an exhaustive organization of content 330, identifies relevant content 330, and provides the relevant content 330 as will be described hereafter. The method 500 may perform the functions of the system 100 and the apparatus 110. In one embodiment, the method 500 is performed using the processor 305. Alternatively, the method 500 may be performed by a program product. The program product may comprise a computer readable storage medium, such as the memory 310, storing program code. The processor 305 may execute the program code to perform the method 500.

The method 500 starts, and in one embodiment, the search module 405 receives 505 the search result 200 from the content host 105. Receiving 505 the search result 200 may be in response to the search module 405 communicating the search query 268 to the content host 105. Alternatively, receiving 505 the search result 200 may be in response to the search module 405 selecting an initial content 330 from the content host 105.

In addition, the search module 405 may index 510 each content identifier 260 for the content 330 received 505 from the content host 105 to the content data 120. Each instance of content 330 may include the content identifier 260 and the related content identifiers 270.

The search module 405 further iteratively retrieves 515 the content 330 for the indexed content identifiers 260 and indexes 520 the related content identifiers 270 for the retrieved content 330. For example, the search module 405 may retrieve 515 the content 330a of the initial search 304 using the indexed content identifiers 260 for the content 330a as shown in FIG. 3. The search module 405 may further index 520 the related content identifiers 270 for the related content 330b in the first level related content 306 as shown in FIG. 3. Previously indexed related content identifiers 270 may not be re-indexed.

Continuing the example, the related content 330b in the first level related content 306 is retrieved 515, and the search module 405 indexes 520 the related content identifiers 270 for the related content 330b of the second-level related content 308 as shown in FIG. 3.

The search module 405 continues to iteratively retrieve 515 the content 330 for the index content identifiers 260 and index 520 the related content identifiers 270 for the retrieved content 330 until the search module 405 determines 525 that all related content identifiers 270 for all the indexed content identifiers 260 have been indexed 520. Until all the related content identifiers 270 have been indexed 520, the search module 405 continues to iteratively retrieve 515 the content 330 for the indexed content identifiers 260 and index 520 the related content identifiers 270.

If the search module 405 determines 525 that all related content identifiers 270 are indexed, the relevance module 410 identifies 530 relevant content 330 from the exhaustive organization of the content 330 in the content data 120. The identification 530 of the relevant content 330 is discussed in greater detail in the description of FIG. 8.

The relevance module 410 further sorts 535 the relevant content 330. The relevance module 410 may sort the relevant content 330 based on sorting criteria. The sorting criteria may be one or more of a content submission time, content views, a content owner, and claims to the content 330.

Alternatively, the relevance module 410 may sort 535 the relevant content 330 based on the engagement score 283 for the content 330. The engagement score 283 may be calculated as a function of responses to the relevant content 330. For example, the engagement score 283 may be calculated from the content comments 223. In one embodiment, the engagement score 283 is an average of content ratings. Alternatively, the engagement score ES 283 is a number of comments. In a certain embodiment, the engagement score is calculated as a function of the content ratings and the number of comments as shown in Equation 1, where ACR is the average content rating, NC is the number of comments, and a and b are non-zero constants.

$$ES=(a*ACR)+(b*NC) \qquad \text{Equation 1}$$

Figure 9:
FIG. 9 is a drawing illustrating one embodiment of providing content.

The relevance module 410 may further provide 540 the sorted relevant content 330 and the method 500 ends. An example of providing 540 the sorted relevant content 330 is shown in FIG. 9.

Figure 8:
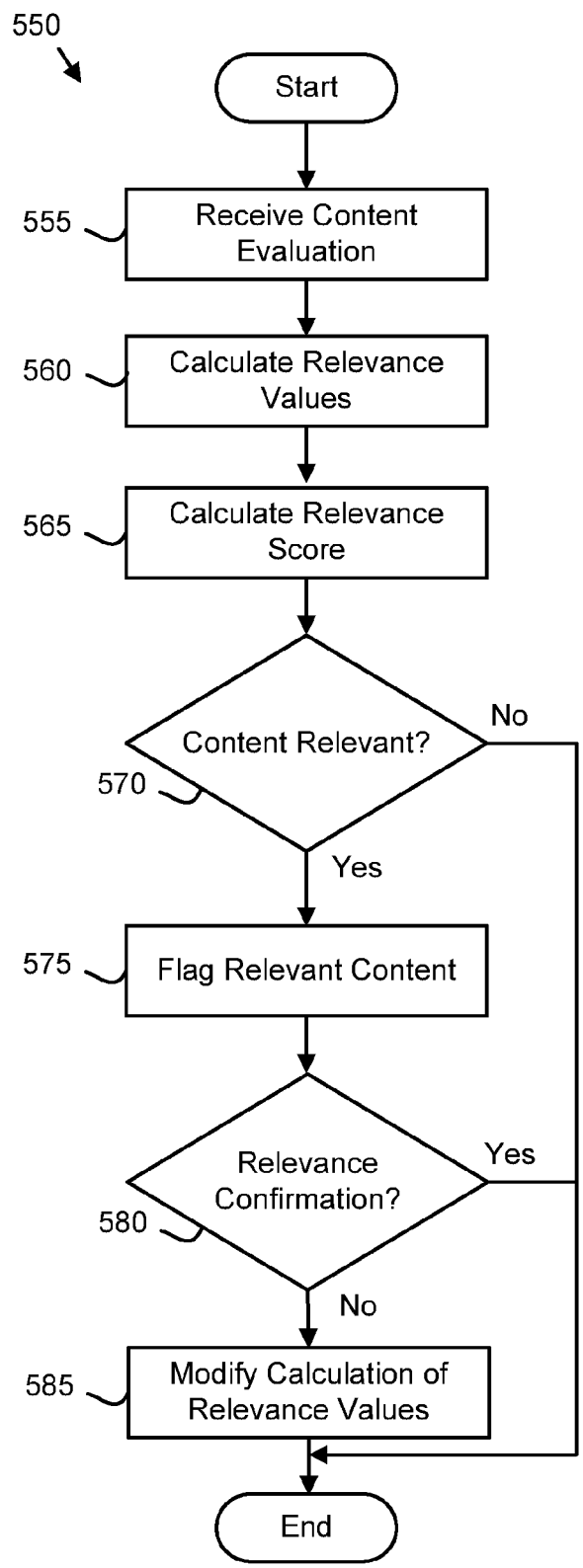
FIG. 8 is a schematic flow chart diagram illustrating one embodiment of a relevant content identification method.

FIG. 8 is a schematic flow chart diagram illustrating one embodiment of a relevant content identification method 550. The method 550 may identify relevant content such as for step 530 of FIG. 7. The method 550 may perform the functions of the system 100 and the apparatus 110. In one embodiment, the method 550 is performed using the processor 305. Alternatively, the method 550 may be performed by a program product. The program product may comprise a computer readable storage medium, such as the memory 310, storing program code. The processor 305 may execute the program code to perform the method 550.

The method 550 starts, and in one embodiment, the relevance module 410 receives 555 the content evaluation 292. The content evaluation 292 may be from an administrator, one or more users, and the like. The content evaluation 292 may describe a relevance of a selected instance of content 330. In one embodiment, the content evaluation 292 rates the selected instance of content 330 on a scale from "not relevant" to "highly relevant." The scale may be a numerical scale.

In one embodiment, the relevance module 410 calculates 560 a relevance value 275 for each content element. Content elements may include but are not limited to the content title 210, the content description 215, the content information 220, the content comments 223, the content data 265, the content length 266, the content channel 267, and the search query 268. In one embodiment, the relevance value RV 275 is calculated using Equation 2, where $k_i$ is a nonzero constant for a specified content element i and $CEF_i$ is one (1) when an instance of a search query element is found in the specified content element i.

$$RV_i = \Sigma k_i CEF_i \qquad \text{Equation 2}$$

The relevance module 410 further calculates 565 the relevance score 273 for the content 330. The relevance score 273 may be calculated as a function of the content elements. In a certain embodiment, the relevant score 273 is calculated as a function of the relevance values 275 for the content elements. For example, the relevant score RS 273 may be calculated using Equation 3, where $j_i$ is a nonzero constant for a specified content element i and $RV_i$ is the relevance value 275 for the specified content element i.

$$RS = \Sigma j_i RV_i \qquad \text{Equation 3}$$

The relevance module 410 further determines 570 if the content 330 is relevant. In one embodiment, the content 330 is relevant content 330 if the relevance score 273 for the content 330 exceeds a relevance threshold. The relevance threshold may be specified by an administrator. Alternatively, the relevance threshold may be calculated automatically as an average of relevance scores 273 for the exhaustive organization of content 330 in the content data 120.

In one embodiment, the content 330 is relevant in response to the content description 215 and/or content title 210 comprising terms with a specified proximity to the search query 268. The specified proximity may be calculated from a logical distance between the terms of the search query 268 within the content description 215.

In one embodiment, the content 330 is relevant in response to the content description 215 and/or content title 210 comprising terms with a specified term density. For example, the content 330 may be relevant if a number of the terms of the search query 268 found in the content description 215 divided by a total number of terms in the content description 215 exceeds a density threshold. The density threshold may be in the range of 1-25 percent.

In a certain embodiment, the content 330 is relevant in response to the content description 215 and/or content title 210 for the content 330 being substantially unique within a content channel 267 of the content 330. The content description 215 may be substantially unique if an association score for the content description 215 is less than an association threshold. The association score may reflect a text clustering closeness of the content 330 to other content 330. In one embodiment, the association threshold is in the range of 0-10 percent.

In one embodiment, a specified number of characters of the content description 215 and/or content title 210 are not evaluated in determining that the content description is substantially unique within the content channel. This may remove from consideration deliberately misleading terms that are added to the content description 215 and/or content title 210.

The content 330 may be relevant in response to the content length 266 being within a specified length range. In one embodiment, the specified length range is plus or minus 5-10 percent of the content length 266.

In one embodiment, the content 330 is relevant in response to content views exceeding a specified view threshold. The view threshold may be a specified number of views. Alternatively, the view threshold may be the number of views for a real number multiple of a standard deviation of a Gaussian distribution of views for all the content 330.

The content 330 may be relevant in response to a content submission time being after the specified submission time. In one embodiment, the specified submission time is a number of hours in the past. Alternatively, the specified submission time may be a real number multiple of a standard deviation of a Gaussian distribution of submission times for all the content 330 in the exhaustive organization stored in the content data 120.

If the relevance module 410 determines 570 that the content 330 is not relevant, the method 550 ends. If the content 330 is relevant, the relevance module 410 flags 575 the relevant content 330. In one embodiment, a relevance value is written to the content data 265 to flag 575 the relevant content 330.

In one embodiment, the relevance module 410 determines 580 if a relevance confirmation is received. The relevance confirmation may be received from a reviewer such as an administrator, a user, a plurality of users, or the like. For example, the reviewer may review the content 330 and confirm that the content 330 is relevant or indicate that the content 330 is not relevant.

Alternatively, the relevance confirmation may be calculated from subsequent content comments 223. For example, if subsequent content comments 223 exceed a confirmation threshold, the relevance confirmation may be affirmative. The relevance confirmation may be calculated as an average rating, a number of comments, a function of the average rating and the number of comments, or calculated as an engagement score 283 as illustrated with Equation 1.

In one embodiment, the relevance confirmation is included in the content evaluation 292 for the content 330. The content evaluation 292 may include a professional/user designation. The professional/user designation may indicate whether the content evaluation 292 is from a professional reviewer or from a user reviewer. The content evaluation may further include a formal title of the reviewer.

In one embodiment, the content evaluation 292 includes a content type describing the content 330. In addition, the content evaluation 292 may include a target content platform specifying how the content 330 is to be viewed. The content evaluation 292 may further include a target audience that specifies audience segments for the content 330. In addition, the content evaluation 292 may include an offensive content type. The offensive content type may specify one or more offensive elements that are included in the content 330. In addition, the content evaluation 292 may include a category for the content 330.

In one embodiment, the relevance value is cleared if the offensive content type for the content 330 exceeds an offensive content threshold. The offensive content threshold may be customized for specified client. For example, the client may not wish for a level of offensive content 330 to be associated with the client's own content 330. By clearing the relevance flag for content 330 with an offensive content type that exceeds the offensive content threshold, offensive content 330 is not included with the relevant content 330.

If the relevance confirmation is received, the method 550 ends. If the relevance confirmation is not received, the relevance module 410 may modify 585 the calculation of the relevance values 275 and/or relevance score 273 and the method 550 ends. For example, the relevance module 410 may modify the nonzero constant k, for one or more content elements. Alternatively, the relevance module 410 may modify other criteria for determining if content 330 is relevant content 330.

FIG. 9 is a drawing illustrating one embodiment of providing content 700. The provided content 700 may display the sorted, relevant content 330 in a table as depicted. One of skill in the art will recognize that the embodiments may also be practiced with the content 700 displayed in other formats.

The provided content 700 includes a content identifier 705, a relevance score 710, a title 715, a content claimant 720, a content channel 725, and a date 730. The content identifier 705 may be the content identifier 260. The relevance score 710 may be the relevance score 273. Alternatively, the relevance score 710 may be an approximation of the relevance score 273 such as a grade based on the relevance score 273. The title 715 may be the content title 210. The content claimant 720 may be the content claimant, the content owner, or combinations thereof from the content data 265.

The embodiments generate an exhaustive organization of content 330 and identify the relevant content 330 from the exhaustive organization. As a result, the set of potential content 330 is greatly expanded beyond what could be retrieved from a typical search or initial instance of content 330. In addition, the relevance of the content 330 is determined so that a complete, relevant organization of content 330 may be provided.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

indexing, by use of a processor, each content identifier for content received in a search result to content data, wherein each content comprises related content identifiers comprising video content elements comprising a content length, a content description, a content channel, and a search query;

iteratively retrieving content for the indexed content identifiers and indexing the related content identifiers for the retrieved content until all related content identifiers for all the indexed content identifiers are indexed;

calculating a relevance value for each video content element;

calculating a relevance score RV as $RV_i = \Sigma k_i CEF_i$ where $k_i$ is a first nonzero constant for a specified content element i and $CEF_i$ is one (1) when an instance of a search query element is found in the specified content element i;

identifying relevant content based on the relevance score, wherein the video content is relevant content in response to a relevance score exceeding a relevance threshold;

flagging the relevant content;

determining whether a relevance confirmation for the relevant content exceeds a confirmation threshold, wherein the relevance confirmation is calculated as an engagement score, wherein the engagement score ES is calculated as $ES=(a*ACR)+(b*NC)$ where ACR is an average content rating for the relevant content, NC is a number of comments for the relevant content, and a and b are non-zero constants;

modifying the first nonzero constants for the relevant content in response to the relevance confirmation not exceeding the confirmation threshold;

recalculating the relevance score in response to the relevance confirmation not exceeding the confirmation threshold;

sorting the flagged relevant content based on the relevance score; and providing the relevant content.

2. The method of claim 1, wherein previously indexed related content identifiers are not re-indexed.

3. The method of claim 1, wherein the content is further relevant in response to a content description comprising terms with a specified term density.

4. The method of claim 1, wherein the content is further relevant in response to a content description comprising terms with a specified proximity to the search query.

5. The method of claim 1, wherein the content is further relevant in response to a content description being substantially unique within a channel.

6. The method of claim 5, wherein a specified number of characters of the content description are not evaluated in determining that the content description in substantially unique within the content channel.

7. The method of claim 1, wherein the content is further relevant in response to a content length being within a specified length range.

8. The method of claim 1, wherein the content is further relevant in response to content views exceeding a specified view threshold.

9. The method of claim 1, wherein the content is further relevant in response to a content submission time being after a specified submission time.

10. The method of claim 1, further comprising sorting the relevant content based on sorting criteria selected from one or more of content submission time, content views, content owner, and claims.

11. The method of claim 1, further comprising sorting the relevant content based on an engagement score for the content calculated as a function of responses to the relevant content.

12. The method of claim 1, further comprising receiving a content evaluation for the content comprising a professional/user designation, a formal title, a content type, a target content platform, a target audience, an offensive content type, and a category.

13. An apparatus comprising:
a processor;
a non-transitory memory storing computer readable code executable by the processor to perform:
indexing each content identifier for content received in a search result to content data, wherein each content comprises related content identifiers comprising video content elements comprising a content length, a content description, a content channel, and a search query;
iteratively retrieving content for the indexed content identifiers and indexing the related content identifiers for the retrieved content until all related content identifiers for all the indexed content identifiers are indexed; and
calculating a relevance value for each video content element;
calculation a relevance score RV as $RV_i = \Sigma k_i CEF_i$ where $k_i$ is a first nonzero constant for a specified content element i and $CEF_i$ is one (1) when an instance of a search query element is found in the specified content element i;
identifying relevant content based on the relevance score, wherein the video content is relevant content is response to a relevance score exceeding a relevance threshold;
flagging the relevant content;
determining whether a relevance confirmation for the relevant content exceeds a confirmation threshold, wherein the relevance confirmation is calculated as a engagement score, wherein the engagement score ES is calculated as $ES=(a*ACR)+(b*NC)$ where ACR is an average content rating for the relevant content, NC is a number of comments for the relevant content, and a and b are non-zero constants;
modifying the first nonzero constants for the relevant content in response to the relevance confirmation not exceeding the confirmation threshold;
recalculating the relevance score in response to the relevance confirmation not exceeding the confirmation threshold;
sorting the flagged relevant content based on the relevance score; and
providing the relevant content.

14. The apparatus of claim 13, wherein the content is further relevant in response to a content description comprising terms with a specified term density.

15. A program product comprising a non-transitory computer readable storage medium storing program code executable by a processor to perform:
indexing each content identifier for content received in a search result to content data, wherein each content comprises related content identifiers comprising video content elements comprising a content length, a content description, a content channel, and a search query;
iteratively retrieving content for the indexed content identifiers and indexing the related content identifiers for the retrieved content until all related content identifiers for all the indexed content identifiers are indexed;
calculating a relevance value for each video content element;
calculating a relevance score RV as $RV_i=\Sigma k_i CEF_i$ where $k_i$ is a first nonzero constant for a specified content element i and $CEF_i$ is one (1) when an instance of a search query element is found in the specified content element i;
identifying relevant content based on the relevance score wherein the video content is relevant content in response to a relevance score exceeding a relevance threshold;
flagging the relevant content;
determining whether a relevance confirmation for the relevant content exceeds a confirmation threshold, wherein the relevance confirmation is calculate as an engagement score, wherein the engagement score ES is calculated as $ES=(a*ACR)+(b*NC)$ where ACR is an average content rating for the relevant content, NC is a number of comments for the relevant content, and a and b are non-zero constants;
modifying the first nonzero constants for the relevant content response to the relevance confirmation not exceeding the confirmation threshold;
recalculating the relevance score in response to the relevance confirmation not exceeding the confirmation threshold;
sorting the flagged relevant content based on the relevance score; and
providing the relevant content.

* * * * *